US008780399B2

(12) United States Patent
Morimoto

(10) Patent No.: US 8,780,399 B2
(45) Date of Patent: Jul. 15, 2014

(54) PRINT MANAGEMENT SYSTEM, DISTRIBUTED PRINTING SYSTEM, AND MANAGING METHOD FOR DISTRIBUTED PRINTING SYSTEM

(71) Applicant: Etsuo Morimoto, Tokyo (JP)

(72) Inventor: Etsuo Morimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 34 days.

(21) Appl. No.: 13/706,725

(22) Filed: Dec. 6, 2012

(65) Prior Publication Data

US 2013/0148160 A1 Jun. 13, 2013

(30) Foreign Application Priority Data

Dec. 12, 2011 (JP) .................................. 2011-271686

(51) Int. Cl.
G06F 15/00 (2006.01)
G06K 1/00 (2006.01)
G06F 3/12 (2006.01)

(52) U.S. Cl.
USPC ........................................ 358/1.15; 358/1.13

(58) Field of Classification Search
USPC ................. 358/1.1, 1.15, 1.13, 1.14
See application file for complete search history.

(56) References Cited

U.S. PATENT DOCUMENTS 6,856,430 B1 * 2/2005 Gase .............................. 358/1.9
8,559,027 B2 * 10/2013 Matsumoto et al. ......... 358/1.13
2005/0002054 A1 1/2005 Shoji et al.

FOREIGN PATENT DOCUMENTS

| JP | 2001-113796 | 4/2001 |
| JP | 2005-017874 | 1/2005 |
| JP | 2006-155017 | 6/2006 |
| JP | 2010-257255 | 11/2010 |

* cited by examiner

Primary Examiner — Douglas Tran
(74) Attorney, Agent, or Firm — Harness, Dickey & Pierce, P.L.C.

(57) ABSTRACT

A print management system, includes a management unit to receive print manuscript data from a connected manuscript processor, and obtain status information indicating states of connected multiple output enabled printers; a status identification unit to predict whether the output enabled printers stop in the middle of a print job; and a print data generator to generate multiple types of print data whose amount of toner consumption during printing is different respectively, based on the print manuscript data. The management unit classifies the output enabled printers predicted that there is less possibility to stop in the middle of a print job as output candidate printers, and selects an output destination printer from the output candidate printers. The management unit selects one type of print data from the multiple types of print data, depending on the output destination printer, and outputs the selected print data to the output destination printer.

18 Claims, 6 Drawing Sheets

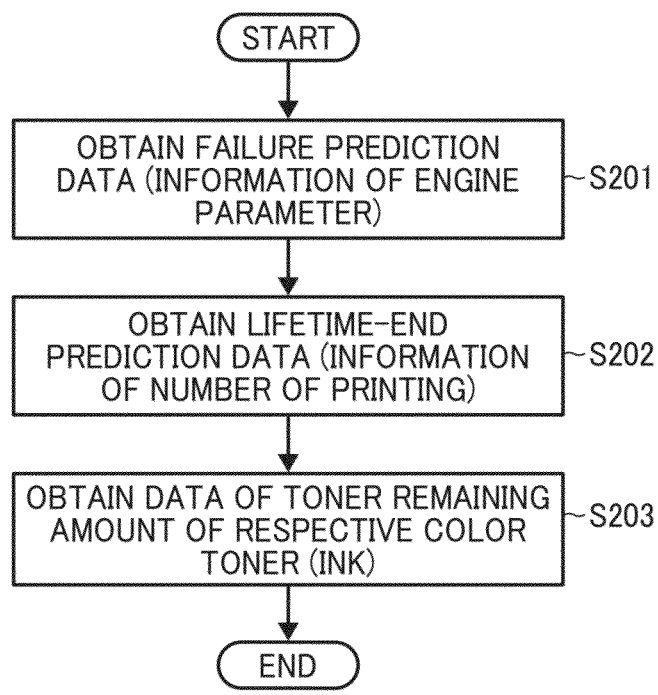

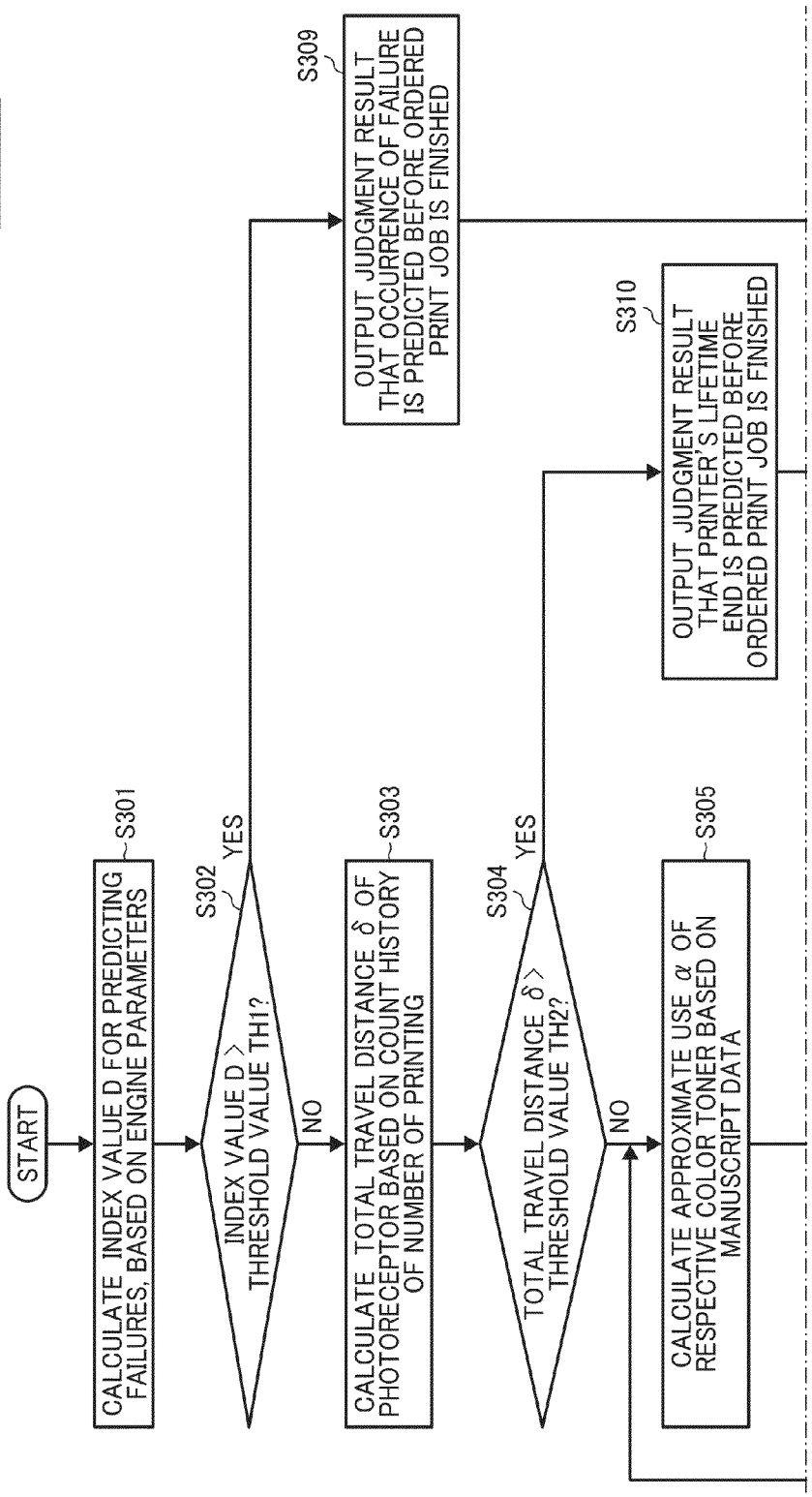

PRINT MANAGEMENT SYSTEM, DISTRIBUTED PRINTING SYSTEM, AND MANAGING METHOD FOR DISTRIBUTED PRINTING SYSTEM

CROSS-REFERENCE TO RELATED APPLICATION

This patent application is based on and claims priority pursuant to 35 U.S.C. §119 to Japanese Patent Application No. 2011-271686, filed on Dec. 12, 2011, in the Japan Patent Office, the entire disclosure of which is hereby incorporated by reference herein.

BACKGROUND

1. Field of the Invention

The present disclosure generally relates to a print management system, a distributed printing system, and a method for managing a distributed printing system.

2. Description of the Background Art

In the digital printing industry, in order to build a mechanism to make a profit from multi-type, small-lot printing, effective print workflows using networks such as Web2Print and online calibration have been introduced. In addition, in the digital printing industry, as the number of ordered copies is large, the most rapid printing available is required. In order to solve this problem, a so-called hybrid workflow technique involving comprehensively managing and efficiently operating multiple output devices on the output side (including those in different places, for example, different branches or at an affiliated printing company) is already known.

However, in the above-described hybrid workflow, when a print engine assigned as an output destination printer stops during operation, since any given printing job is assigned to multiple output printers not located near a server, throughput decreases and the output device owner must take emergency repairs.

In a printing system as proposed in JP-2006-155017-A, in order to process printing as rapidly as possible, a management device (server) generates and manages page description language (PDL), intermediate data (e.g., portable document format (PDF)), and raster image data from input data, and outputs the most suitable intermediate print data from among these when a print command is input. This printing system is similar to the present invention in that the management device (server) prepares processed data in advance so that the rapid printing can process. However, the problem described above remains unresolved: Once the print engine assigned as the output destination printer stops in the middle of printing, throughput is decreased and the output device owner must undertake urgent repairs.

BRIEF SUMMARY

In one aspect of this disclosure, there is provided a novel print management system, connected to a manuscript processor and multiple output enabled printers via a network. The print management system includes a management unit, a status identification unit, and a print data generator. The management unit receives print manuscript data from the manuscript processor and obtains status information from the multiple output enabled printers indicating states of the respective multiple output enabled printers. The status identification unit predicts whether the output enabled printers stop in the middle of a print job. The print data generator generates multiple types of print data whose amount of toner consumption during printing differs based on the print manuscript data. The management unit classifies those printers predicted by the status identification unit to have a smaller possibility of stopping in the middle of a print job as output candidate printers. The management unit selects an output destination printer from the output candidate printers. The management unit selects one type of print data from the multiple types of print data generated by the print data generator depending on the output destination printer selected by the management unit. The management unit outputs the selected print data to the output destination printer.

In another aspect of this disclosure, there is provided a novel distributed printing system. The distributed printing system includes a manuscript processor to receive print manuscript data from an internet-connectable terminal, output devices including multiple output enabled printers, and the above-described print management system, connected to the manuscript processor and the output devices via a network.

In another aspect of this disclosure, there is provided a novel method for managing a distributed printing system, including receiving print manuscript data from an internet-connectable terminal; obtaining status information, from connected multiple output enabled printers, indicating states of the respective multiple output enabled printers; predicting whether or not the respective output enabled printers stop in the middle of a print job; classifying those printers predicted to have a smaller possibility of stopping in the middle of a print job as output candidate printers; selecting an output destination printer from the output candidate printers; generating multiple types of print data whose amount of toner consumption during printing differs depending on the print manuscript data; selecting one type of print data from the multiple types of print data depending on the output destination printer; and outputting the selected print data to the output destination printer.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a flow chart illustrating steps in a process of obtaining status information of printers by a management unit in the print management system;

FIGS. 4A and 4B are a flow chart illustrating steps in a status identification process in a status identification unit in the print management system;

DETAILED DESCRIPTION OF PREFERRED EMBODIMENTS

Figure 1:
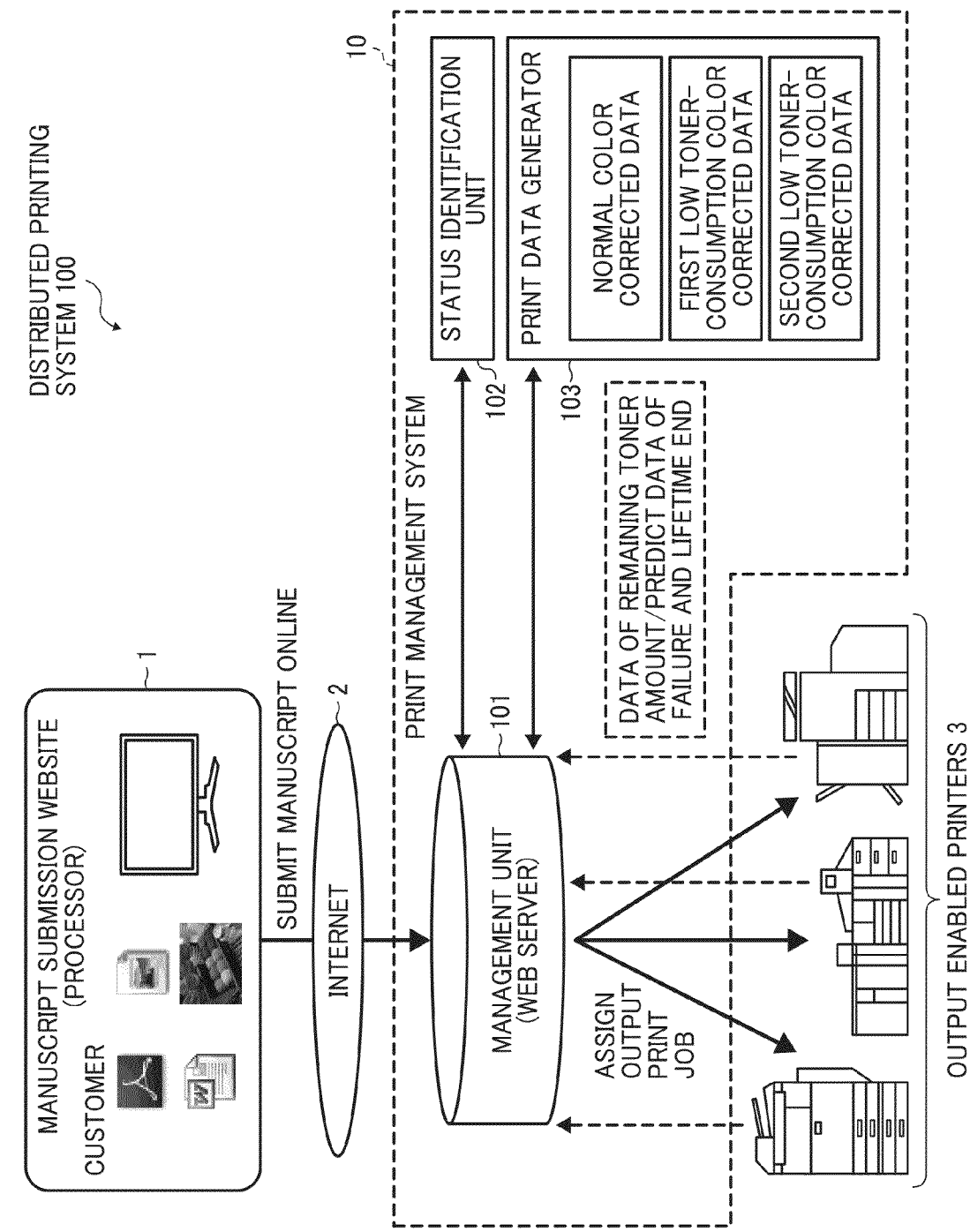
FIG. 1 is a diagram illustrating an overall configuration of a print management system in distributed printing system.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result. Referring now to the drawings, wherein like reference numerals designate identical or corresponding parts throughout the several views thereof.

Embodiment

A print management system of the present disclosure is described below with reference to FIG. 1. FIG. 1 is a diagram illustrating an overall configuration of the print management system 10 in a distributed printing system 100. The distributed printing system 100 includes a manuscript submission website (web manuscript processor) 1, a print management system 10, and output enabled devices 3. The print management system 10 includes a management unit (WEB manuscript submission server) 101 connected to the manuscript submission website 1 of an external device via a network (e.g., Internet 2), a status identification unit 102 to determinate failure occurrence, coming end of the device's lifetime, and coming end of the toner, and a print data generator 103 to generate color-corrected pre-print data. The management unit 101 is connected to various output enabled devices 3 to perform print job via the network. The output enabled devices 3 include a remote device, hereinafter collectively said as a just output enabled printers 3.

Herein, when customers submit print manuscript data (print document data), which the order wants to print out to the manuscript submission website 1, using a network-connectable (internet-connectable) terminal (e.g., computer terminal, tablet computer, smart-phone, portable phone, and TV) via the network (e.g., internet), the manuscript submission website 1 receives the manuscript data. The management unit 101 receives the manuscript data from the manuscript submission website 1 via the network 2 and obtains status information indicating the states of the respective output enabled printer 3 sent from the output enabled printer 3, and the sends the status information to the status identification unit 102. In addition, the management unit 101 classifies the output enabled printers that has no chance to stop during execution of a print job as output candidate printers, based on the identification of the status identification unit 102. Then, the management unit 101 selects an output destination printer from the output candidate printers, based on the identification of the status identification unit 102. In addition, the print data made by the print data generator 103 based on the print manuscript data, is selected corresponding to the output destination printer, and print is executed in the output destination printer.

The status identification unit 102 predicts whether the output enabled printers 3 have possibility of stopping in the middle of a print job, based on the respective status information of the output enabled printers 3. The print data generator 103 generates, for example, three types of the print data having different toner consumption, including color-corrected pre-print data, based on the print manuscript data from the manuscript submission website 1, corresponding to a respective one of the output candidate printer. The generated color-corrected pre-print data are stored in a storage unit (not shown).

Figure 2:
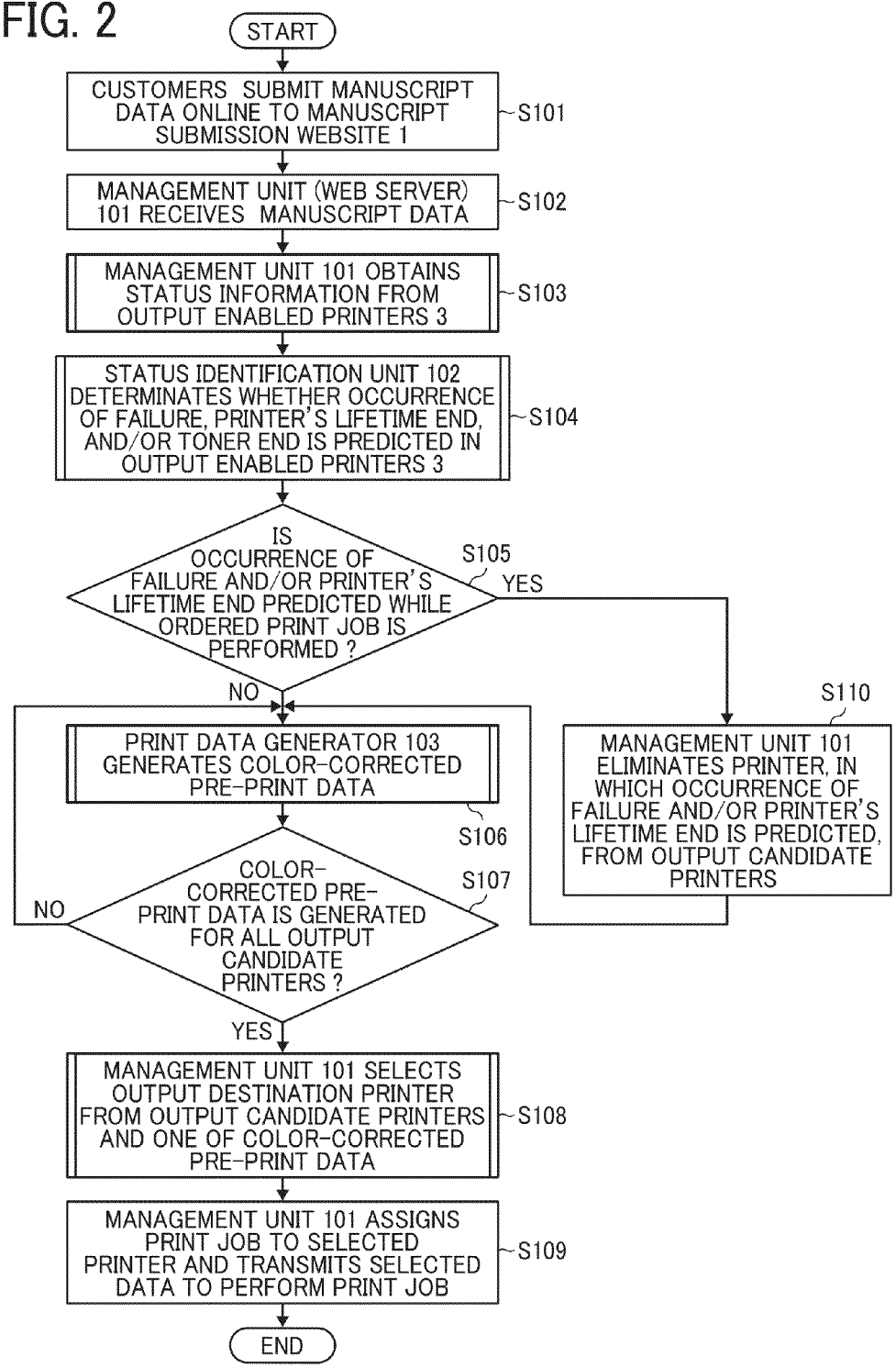
FIG. 2 is a flow chart illustrating a print management process executed by the print management system shown in FIG. 1.

Next, a print management operation of print management system 10 is described below. FIG. 2 is a flow chart illustrating a print management process executed by the print management system 10 in the distributed printing system 100. At step S101, the manuscript submission website 1 receives the print manuscript data (WEB submission of the manuscript) which the customer required to print via the network.

It is to be noted that the submission method for submitting the manuscript is often performed by submitting the manuscript using a computer terminal connected to the network, in common. However, the submission method is not limited thereto. For example, only a device (internet-connectable device) that can connect to the network, television, mobile phone, and smart phone is applicable.

Then, at step S102, the print manuscript data is sent to the management unit (WEB manuscript server) 101 of the print management system 10 via the network such as Internet 2. The contractor (e.g., printing company) receives the print manuscript data using the management unit 101 (S102).

When receiving the manuscript data, initially, the management unit 101 queries the respective output enabled printers 3 under the control of the print management system connected via the network, and obtains (collects) the status information (failure prediction data, lifetime-end prediction data, data of toner remaining amount) at step S103. Herein, the word "toner" also includes a developing material such as ink, and developer.

The management unit 101 transmits the received print manuscript data from the manuscript submission website 1 and the status information obtained from the respective output enabled printers 3 to the status identification unit 102. Then, at step S104, the status identification unit 102 determines whether or not the output enabled printers have possibility of stopping the print operation when the corresponding output enabled printer 3 executes the ordered print job. More specifically, the status identification unit 102 determines whether the output enabled printers 3 have possibility of stopping in the middle of a print job based on the failure prediction data, the lifetime-end prediction data, the data of toner remaining amount, assuming that the print job is assigned to the respective printer engines of the output enabled printers.

Subsequently, at step S105, the management unit 101 receives the determination result (prediction result) of the status identification unit 101. When the determination result for the printer indicates that the occurrence of failure or/and printer's lifetime end is predicted before the job finished (Yes at S105), the management unit 101 eliminates those printer to have a larger possibility of stopping in the middle of a print job from the output candidate printers. That is, the management unit 101 classifies those printers predicted by the status identification unit 102 to have a smaller possibility of stopping in the middle of a print job as output candidate printers.

Then, the management unit 101 transmits the print manuscript data to the print data generator 103, and the print data generator 103 generates three types of the print data (color-corrected pre-print data) for respective output candidate printers, based on the print manuscript data.

(i) First Type of Data:
First type of data is "normal color-corrected pre-print data" formed by performing the color correction, using normal color correction parameter.

(ii) Second Type of Data:
Second type of data is "a first low toner-consumption color-corrected pre-print data". The "first low toner consumption color-corrected pre-print data" is formed by performing a predetermined image process needed for reducing the toner consumption at edge portions of the print manuscript data to reduce the toner consumption than the normal type (first type of data), and then performing the color correction, using the normal color correction parameter.

(iii) Third Type of Data:

Third type of data is "a second low toner-consumption color-corrected pre-print data". "The second low toner-consumption color-corrected pre-print data" is formed by performing color correction, using parameters of color correction that replicates light color than usual, so as to further reduce the toner consumption than the second type of data.

At step S107, the processes of generating the data at step S106 performed for all output candidate printers is confirmed.

When the "color-corrected pre-print data" is generated for the all output candidate printers 3 (Yes at S107), at step S108, the management unit 101 selects one output destination printer from the output candidate printer not eliminated at step S105. The output candidate printers are the printers that the failure occurrence is not predicted before job is finished, the printer that the printer's lifetime end is not reached before the print job is finished, and the printer that the toner end before the print job is finished. In addition, the management unit 101 selects one of the color-corrected pre-print data used for printing in the selected output destination printer (one or multiple printer).

Then, at step S109, the management unit 101 assigns the print job to the output destination printer selected from the output candidate printers, and the management unit 101 transmits the color-corrected pre-print data selected corresponding to the output destination printer. The selected printer executes the print job, that is, the output destination printer prints the print manuscript data at step S109, using the selected color-corrected pre-print data.

FIG. 3 is a flow chart illustrating steps in a process of obtaining the status information of the output enabled printers 3 by the management unit 101. At step S102 shown in FIG. 2, when the management unit 101 receives the print manuscript data from the manuscript submission website 1, the management unit 101 queries the output enabled printers 3, to acquire the status information containing the failure prediction data, the lifetime end prediction data, and data of toner remaining amount.

The process in the management unit 101 to obtain the status information of the output enabled printers 3 has three stages. Initially, at step S201, the management unit 101 acquires the e failure prediction data in the printer engines (e.g., various types of engine parameters) of the output enabled printers 3.

Subsequently, at step S202, the management unit 101 acquires the lifetime end prediction data in the printer engines (e.g., count history of number of printing) of the output enabled printers 3.

Then, at step S203, the management unit 101 acquires the data of the remaining amount of the respective color toner in the output enabled printers 3.

Specific methods to predict lifetime end are variously known. As one example, in electrographic image forming printer, remaining lifetime end of a photoreceptor module (module Md) is predicted based on a total travel distance $\delta$ (number of rotation) of the previous photoreceptor, which way is used in the present disclosure. The total travel distance $\delta$ is calculated based on product P obtained by respective sheet size and printing number. Therefore, the management unit 101 acquires information of number of printing from counter of the printer. With this operation, the acquisition of the status information indicating the state of the printer engine is completed.

It is to be noted that, specific methods to predict failure are variously known. The present disclosure adapts a failure predict method proposed in JP-2005-017874-A.

The failure prediction method is described below. Initially, the status information of the target device (output enabled printers) is obtained, only one index value D is calculated based on the obtained status information, and the occurrence of failure is predicted based on the temporal change. Before calculating the index value, a calculation method is determined In the calculated method, multi-dimensional spaces, in which different coordinate axes are set respectively, are defined for the multiple information (status information), and the index value D are calculated as the distance in the multi-dimensional spaces.

That is, in order to decide the calculation method to calculate the index value, n combinations of k pieces of data (status information) are related to the state of the image forming apparatus. Table 1 illustrates the configuration of the obtained data. Under a first condition (for example, a first day, and a first printer, or like), k data (k pieces of information) can be obtained. These data are defined as y11, y12, . . . , y1$k$. Similarly, the data obtained under a next condition (for example, a second day, a second printer, or like), are defined as y21, y22, . . . , y2$k$. Thus, n combinations of data are obtained.

TABLE 1

| COMBINATION | TYPE OF INFORMATION | | | |
|---|---|---|---|---|
| NUMBER | (1) | (2) | ... | (k) |
| 1 | $y_{11}$ | $y_{12}$ | ... | $y_{1k}$ |
| 2 | $y_{21}$ | $y_{22}$ | ... | $y_{2k}$ |
| . | . | . | ... | . |
| . | . | . | . | . |
| . | . | . | . | . |
| n | $y_{n1}$ | $y_{n2}$ | ... | $y_{nk}$ |
| AVERAGE | $y_1$ | $y_2$ | ... | $y_k$ |
| STANDARD DEVIATION | $\sigma_1$ | $\sigma_2$ | ... | $\sigma_k$ |

Next, raw data (e.g., $y_{ij}$) are standardized by an average ($y_j$) and standard deviation ($\sigma_j$). Table 2 illustrates the result obtained by standardizing d the data shown in Table 1, using the formula 1.

$$Y_{ij} = (y_{ij} - y_j)/\sigma_j \quad (1)$$

TABLE 2

| COMBINATION | TYPE OF INFORMATION | | | |
|---|---|---|---|---|
| NUMBER | (1) | (2) | ... | (k) |
| 1 | $y_{11}$ | $y_{12}$ | ... | $y_{1k}$ |
| 2 | $y_{21}$ | $y_{22}$ | ... | $y_{2k}$ |
| . | . | . | ... | . |
| . | . | . | . | . |
| . | . | . | . | . |
| n | $y_{n1}$ | $y_{n2}$ | ... | $y_{nk}$ |
| AVERAGE | 0 | 0 | ... | 0 |
| STANDARD DEVIATION | 1 | 1 | ... | 1 |

Next, all correlation coefficients rpq (=rqp) between two pairs(combinations) in k combinations of the data are calculated, using the formula 2, and the obtained data is expressed by a matrix R as indicated by the formula 3. Then, an inverse matrix R of the correlation coefficients is calculated. The calculated result is expressed by a matrix A as indicated by the formula 4. "$\Sigma$" in the formula 2 indicates a summation related to a suffix (i).

$$R_{pq} = R_{qp} = \frac{\Sigma(Y_{ip}Y_{iq})}{\Sigma(Y_{ip}^2 \Sigma Y_{iq}^2)^{1/2}} \quad (2)$$

Correlation Coefficient Matrix $$R = \begin{pmatrix} 1 & r_{12} & r_{13} & \ldots & r_{1k} \\ r_{21} & 1 & r_{23} & \ldots & r_{2k} \\ r_{31} & r_{32} & 1 & \ldots & r_{3k} \\ \ldots & \ldots & \ldots & \ldots & \ldots \\ r_{k1} & r_{k2} & r_{k3} & \ldots & 1 \end{pmatrix} \quad (3)$$

Inverse Matrix $$A = \begin{pmatrix} a_{11} & a_{12} & a_{13} & \ldots & a_{1k} \\ a_{21} & a_{22} & a_{23} & \ldots & a_{2k} \\ a_{31} & a_{32} & a_{33} & \ldots & a_{3k} \\ \ldots & \ldots & \ldots & \ldots & \ldots \\ a_{k1} & a_{k2} & a_{k3} & \ldots & a_{kk} \end{pmatrix} \quad (4)$$

With these calculations, the values of calculated parameters in the calculation formula when only one index value is calculated are determined. Since all data groups handled here express the normal state, it is considered that the obtained various pieces of information have a predetermined correlation. When the state of the apparatus becomes far from the normal state and nearly enters the abnormal state such as a failure, the correlations between the parameters are disturbed, and distances from originals (average in stable state) in the defined multi-dimensional space defined above increase. The distances mean the index values.

An index value at an arbitrary timing is calculated as below. Initially, data (status information) x1, x2, . . . , and xk of k types in the arbitrary state are acquired. The types of the data correspond to the data y11, y12, . . . , and y13, or like. Next, the acquired data is stabilized, using the formula 5. The stabilized data are defined as X1, X2, . . . , and Xk. Then, the index value D2 is calculated using the calculation formula 6 defined by the elements "akk" of the inverse matrix A that has been calculated. It is to be noted that a value D that is a square root of the index value is called a "Mahaalanobis's distance". "Σ" in the formula 6 indicate summation relate to suffixes p and q.

$$Y_j = (x_j - y_j)/\sigma_j \quad (5)$$

$$D^2 = (1/k)\Sigma a_{pq} X_p X_q \quad (6)$$

Using the above described method, in the present embodiment, by detecting the shift (time change) of the value "D" that is square root of the value "$D^2$", it is observed that the occurrence of the abnormal state (failure) in the image forming apparatus where the index value is greatly disturbed. In addition, in the present embodiment, in order to determine the predict of the failure occurrence, that is, in order to calculate the index value to execute the determination, various types of engine parameters such as a developing start voltage, a charging voltage, a LD driving current are obtained.

Figure 4B:
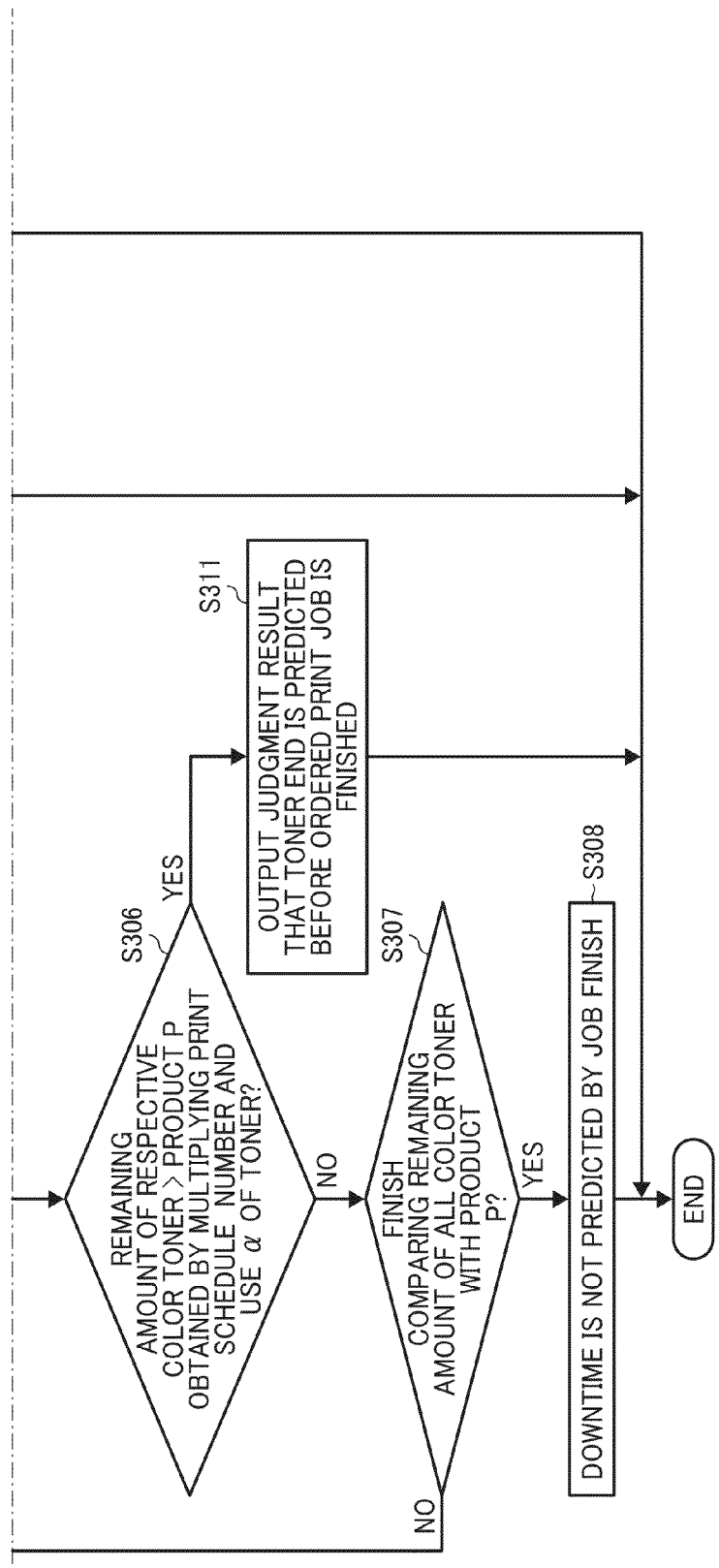

Next, the steps of the status identification process (prediction processes of failure occurrence, device's lifetime end, and toner end) are described below. FIGS. 4A and 4B are a flow chart illustrating steps in the status identification process. More specifically, the management unit 101 transmits the status information obtained from the output enabled printers 3. The status identification unit 102 determines whether or not the output enabled printers have possibility of stopping the print job in the printer engines while the ordered printing is executed. The flowchart of FIGS. 4A and 4B illustrates the flow of the operating procedure at that time.

In FIG. 4A, when the status identification process (deciding process of failure occurrence, device life end, and toner end), initially, using the various types of the engine parameter, the index value D for predicting failure is calculated at step S301. The specified calculation method to obtain the index value D is already described above.

Next, at step S302, the status identification unit 102 compares the calculation result of the index value D and a fixed threshold value TH1 set in advance. When the index value D is greater than the threshold value TH1 (Yes at S302), the status identification unit 102 outputs the judgment result indicating that, if the ordered print job is performed, the failure occurrence is predicted before the job finished at step S309. Then, the process of the status identification unit 102 in FIGS. 4A and 4B (hereinafter just "FIG. 4") is finished. On the other hand, when the index value D is equal to or smaller than the threshold value TH1(No at S302), the process proceeds to step S303 during which the total travel distance δ of the photoreceptor is calculated from the output print history counter.

It is to be noted that, although the judgment of the failure prediction is executed by calculating the index value D, as one example, other methods can be adopted. Further, the fixed threshold value TH1 can be determined arbitrarily by experiment. Herein, the judgment (prediction) of the failure occurrence is automatically executed, using two values (Yes, No).

Alternatively, by setting the multistage fix values, the management unit 101 judges failure prediction of the printer engine of the output enabled printer at multiple levels having judgment results of "failure probable" that the occurrence of failure is surely predicted, "failure possible" that the possibility of the failure occurrence is relatively high and probability of the failure occurrence is higher than normal, but there are some time buffer, and "failure unlikely" that the occurrence of failure is not predicted. Then, except the determination result of "failure probable", the status identification unit 102 can query the owner (user), and the final judgment of the failure prediction (output destination printer and/or print data) can be manually selected.

Subsequently, at step S303, using the counter information of the number of printing history counter, the total travel distance δ of the photoreceptor is calculated. Then, at step S304, the status identification unit 102 compares the calculation result of the total travel distance δ with a fixed threshold value Th2 set in advance. When the total travel distance δ is greater than the threshold value TH2 (Yes at S304), the status identification unit 102 outputs the determination result that, if the ordered print job is performed, "the device lifetime end" is predicted before the job is finished at step S310. Then, the process of the status identification unit 102 in FIG. 4 is finished.

It is to be noted that, although the judgment of the lifetime predict of the magenta photoreceptor Md is executed, by, for example, calculating the total travel distance δ, alternatively, the total travel distance δ can be calculated for the other colors of photoreceptors. Further, it is preferable that the adoption of the multiple distances of the photoreceptors Md can be applied for the prediction. In addition, although the judgment of the lifetime predict of the photoreceptor Md is executed, by, for example, calculating the total travel distance δ, alternatively, the other prediction method to predict the end of photoreceptor Md life can be adopted, of course.

On the other hand, when the calculation result of the total travel distance δ is equal to or smaller than the threshold value TH2 (No at S304), the status identification unit 102 calculates an approximate toner consumption amount α of the respective color toners (C, M, Y, and Bk) from the print manuscript data at step S305. Then, using the toner consumption amount obtained in step S305 and the respective colors of the remaining toner amount obtained in step S203 shown in FIG. 2, the status identification unit 102 compares the product P obtained by multiplying "print schedule number" by "toner consumption amount α" with the toner remaining amount at step S306. When the product P is greater than the toner remaining amount (Yes at S306), the status identification unit 102 outputs the judgment result (prediction result) that, if the ordered print job is performed, the toner is ended before the job finished, at step S311. Then, the process of the status identification unit 102 shown in FIG. 4 is finished Conversely, when the product P obtained by multiplying "print schedule number" by "toner consumption amount α", is equal to or lower than the toner remaining amount (No at S306), the status identification unit 102 confirms whether or not the processes of the stops S307 and S308 for the respective colors are executed at step S307. When the processes of steps S307 and S308 are finished (Yes at S307), the status identification unit 102 outputs the judgment result that, if the ordered print job is performed "downtime until the ordered job is finished is not predicted" at step S308. Then, the process of the status identification unit 102 is finished.

Figure 5:
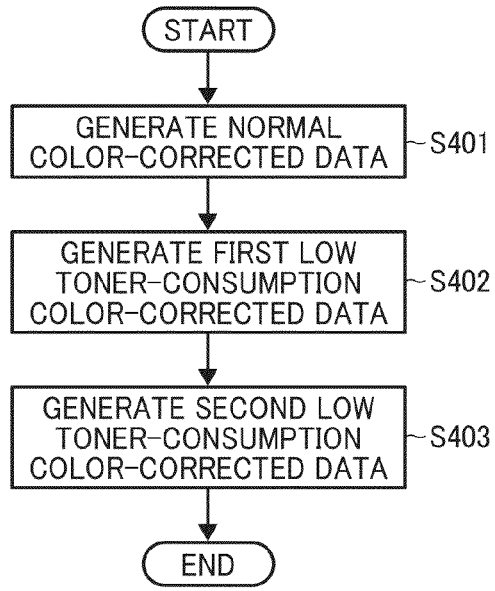
FIG. 5 is a flow chart illustrating steps in a process of generating color-corrected pre-print data in a print data generator in the print management system.

FIG. 5 is a flow chart illustrating steps in process of generating the color-corrected pre-print data in the print data generator 103. The management unit 101 transmits the print manuscript data to the print data generator 103. The print data generator 103 generates three types of the color-corrected pre-print data for respective output candidate printers. FIG. 5 is a flowchart illustrating the operation steps at this time.

In FIG. 5, as a first type of data, the print data generator 103 executes the color correction process using the "normal color correction parameter", and generates the "normal color-corrected pre-print data" at step S401. As a second type of data, in order to reduce the toner consumption than the first type of data, after a predetermined image process is executed to reduce the consumed toner in edge portions of the print manuscript data, the print data generator 103 executes the color correction process using the "normal color correction parameter". Thus, the print data generator 103 generates a "first low toner-consumption color-corrected pre-print data" at step S402.

More specifically, the print data generator 103 detects the edge portions of the print manuscript image data (edge is extracted by the primary differentiation and the secondarily differentiation). Then, the print data generator 103 executes the process to limit the value of the pixel data exceeding a correction value TH3 to the correction data so that the pixels detected as the edge portion is set smaller than the pixels when the print manuscript image data is input. By correcting the value of the pixel data to the small value based on the predetermined condition, the value of pixels detected as the edge portions is set at smaller pixels after the correction, thus reducing the amount of toner consumption. Herein, although the amount of toner consumption is decreased by performing the image process for the edge portions, the amount of toner consumption may be decreased by another method.

As a third type of data, in order to reduce the toner consumption than the second type of data, the print data generator 103 executes the color correction process using a "thin color correction parameter" to replicate subtle color. Thus, the print data generator 103 generates a "second low toner-consumption color-corrected pre-print data".

The above operation describes generating the color-corrected pre-print data, for reducing the amount of toner consumption; alternatively, the data replicating single black color (Bk) can be generated and set as the selection candidate data. It is to be noted that the color-corrected pre-print data can contain the print data that converts into the monochrome image of the single black color Bk. With this setting, the monochrome print operation can correspond to the case in which the remaining amount of the color other than the black toner Bk is low.

Figure 6:
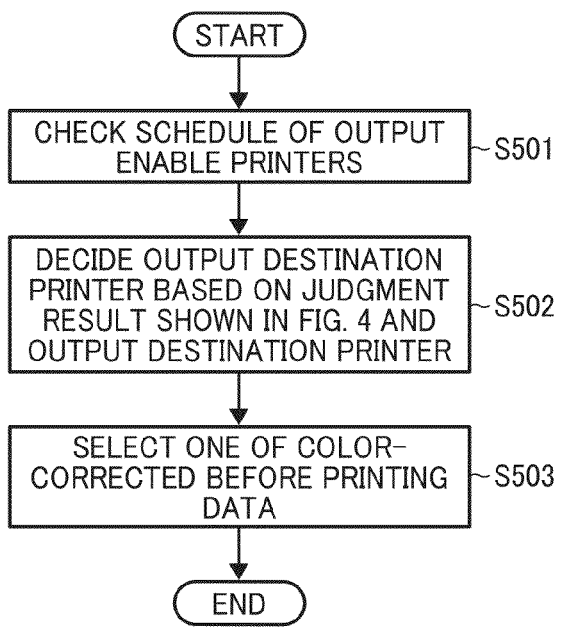
FIG. 6 is a flowchart illustrating steps in a selection process of the output destination printer and a selection process of the color-corrected pre-print data.

FIG. 6 is a flowchart illustrating steps in the selection process of the output destination printer and the selection process of the color-corrected pre-print data. In this process, for all output candidate printers, after multiple types of the print data (color-corrected pre-print data) are prepared, the management unit 101 determines the output destination printer (multiple is capable) from the output candidate printers that is not eliminated at step S105 shown in FIG. 2. FIG. 6 is flow chart illustrating the operation process at this time.

Initially, the management unit 101 checks the schedules of the respective output candidate printers not eliminated at step S105 shown in FIG. 2. As one example, a schedule regulated by a known schedule management device proposed in JP-2001-113796-A is used. More specifically, the information of the print manuscript data is registered in a schedule management device connected to the output candidate printers as a part of schedule data, and the registered print manuscript data is printed based on the checked schedule.

Subsequently, based on the schedules of the respective output candidate printers checked at step S501, the management unit 101 evaluates which output candidate printer is selected for the output destination printer, which print job is allocated to the selected output destination printer, and how many copies are allocated to the selected output destination printer. Thus, the management unit 101 selects the output destination printer at step S502.

Then, at step S503, the management unit 101 selects which of the print data (the color-corrected pre-print data) is to be used for the respective output destination printer decided at step S502. More specifically, the selection of the print data at step S502 is performed with reference to the comparison of the product P obtained by multiplying "the print schedule number" by "the toner consumption amount α" with the amount of remaining toner at step S306 shown in FIG. 4B, which may be set by the owner (user) manually or be performed automatically as described below. Alternatively, the selection may be automatically performed at the time the recommended data is selected and then a final determination may be performed by querying the owners.

Next, the selection method to automatically select the color-corrected pre-print data in the management unit 101 is described below. The management unit 101 automatically selects the print data, based on the comparison result of the product P obtained by multiplying "print schedule number" by "toner consumption amount α" with the toner remaining amount, with reference to at step S306 shown in FIG. 4B.

More specifically, when the print schedule number can be printed using the remaining toner amount, and margin of the remaining toner ratio is equal to or greater than the 10%, the management unit 101 selects the "normal color-corrected pre-print data". When the print schedule number can be output, using the remaining toner amount and the margin of the remaining toner ratio is smaller than 10%, the management unit 101 selects the "first low toner-consumption color-corrected pre-print data". When the print schedule number can be printed using the remaining toner amount and the margin of the remaining toner ratio is smaller than 3%, the management unit 101 selects the "second low toner-consumption color-corrected pre-print data".

It is to be noted that, above-described selection is performed by switching "the color-corrected pre-print data" in accordance with the margin of the remaining toner ratio in a single printer. However, when the same print job is assigned to the multiple output destination printers, it is preferable that the output result formed on the multiple output sheets from the all output destination printers be similar as much as possible. Therefore, it is preferable that all the selected color-corrected pre-print data used for the all output destination printers are identical. For example, when the margin of the remaining toner ratio is smaller than 10% in one output destination printer and the "first low toner-consumption color-corrected pre-print data" is selected in this printer, "the first low toner-consumption color-corrected pre-print data" is selected for the other output destination printer(s).

In above-described present disclosure, in the print management system 10, preparing the collection data of the status information (failure prediction data, lifetime end prediction data, and the data of toner remaining amount indicating the state of the printer engines of the output enabled printers 3, and preparing the multiple types of "the color-corrected pre-print data", the state of the output enabled printer 3 are identified (classified) based on the collected data in advance. Thus, the printers to have high possibility of generating failure in the middle of a print job are automatically eliminated from the output candidate printers.

In addition, by collecting the data of toner remaining amount as the status information indicating the engine condition, for the output candidate printers that have a possibility of finishing the toner during the print job, the color correction is performed, using the color-corrected data to save the usage of the toner amount. Thus, stoppage during the print job can be avoided before it happens.

As described above, by preparing the multiple types of the "color-corrected pre-print data", the printing can be performed while the suitable data is selected in accordance with the margin of the amount of remaining toner. For example, when the status identification unit 102 judges the output candidate printers have possibility of needing to be repaired in the middle of a print job, by preparing the multiple types of the "color-corrected pre-print data", the status identification unit 102 can select the suitable data from the multiple types of "the color-corrected pre-print data" whose toner consumption is little", depending on the margin of the amount of remaining toner; which avoids the repair used by the toner end in the middle of the print job. With this operation, even when the remaining toner is little, by selecting the "low toner-consumption color-corrected pre-print data" whose toner consumption is little, an orbital printer can be forcefully selected.

It is to be noted that the management unit 101 may include a manual override in which the owner (user) can manually eliminate a certain printer from the output candidate printers to select the output destination printer and determine the "color-corrected pre-print data". By deciding the setting of the printer by the user, when the user wants a specified printer to output the sheet (for example, the output in the printer positioned near the owner, to hold the output sheet within easy reach), the owner (user) can select the specified printer as the output destination printer.

For example, when the management unit 101 determines whether or not the specified printer is eliminated from the output candidate printers, in a case in which the status identification unit 102 determines "failure probable" that the corresponding output enabled printer 3 surely needs to be repaired in the middle of the print job, the corresponding printer is eliminated from the output candidate printers. In a case in which delicate determination "failure possible" that the sign of the failure is seen or there is some buffer in time by the time of failure occurrence in the output enabled printers, the management unit 101 makes the user inquires and determine. Similarly, when the management unit 101 selects the output destination printer from the output candidate printers, in a case in which delicate determination "failure possible" that the sign of the failure is seen or there is some buffer in time by the time of failure occurrence in the output candidate printers, the management unit 101 makes the user inquires and determine.

Accordingly, the management unit 101 may further include the manual override as an acquisition and determination mechanism to prohibit the selection in the management unit 101, in other words, the management unit 101 invalidates the previously selected output destination printer and the previously selected print data. The manual override includes a displaying device and an input device. The displaying device, such as liquid crystal (LC) and electro luminescence (EL), displays the determination result from the status identification unit 102, the output enabled printers 3, the output candidate printers, and the multiple types of "color-corrected pre-print data" from the print data generator 103. The user selects the output destination printer and/or the print data (color-corrected pre-print data), using the input device, based on the contents displayed on the displaying device.

Numerous additional modifications and variations are possible in light of the above teachings. It is therefore to be understood that, within the scope of the appended claims, the disclosure of this patent specification may be practiced otherwise than as specifically described herein.

What is claimed is:

1. A print management system, connected to a manuscript processor and multiple output enabled printers via a network, comprising:
 a management unit to receive print manuscript data from the manuscript processor, and obtain status information from the multiple output enabled printers indicating states of the respective multiple output enabled printers;
 a status identification unit to predict whether the output enabled printers stop in the middle of a print job; and
 a print data generator to generate multiple types of print data whose amount of toner consumption during printing differs based on the print manuscript data,
 wherein the management unit classifies those printers predicted by the status identification unit to have a smaller possibility of stopping in the middle of a print job as output candidate printers,
 the management unit selects an output destination printer from the output candidate printers,
 the management unit selects one type of print data from the multiple types of print data generated by the print data generator depending on the output destination printer selected by the management unit, and
 the management unit outputs the selected print data to the output destination printer.

2. The print management system according to claim 1, wherein the status information contains failure prediction data for print engines of the output enabled printers, and the status identification unit predicts whether the output enabled printers stop in the middle of a print job based on the failure prediction data for print engines of the output enabled printers.

3. The print management system according to claim 1, wherein the status information contains lifetime prediction data for the output enabled printer, and
the status identification unit predicts whether the output enabled printers stop in the middle of a print job based on the lifetime prediction data for the output enabled printers.

4. The print management system according to claim 1, wherein the status information contains data of toner remaining amount in the output enabled printers, and
the status identification unit predicts whether the output enabled printers stop in the middle of a print job based on the data of toner remaining amount.

5. The print management system according to claim 1, wherein the status information contains data of toner remaining amount in the output enabled printers, and
the management unit decides the print data to be printed in the output destination printer based on the data of the toner remaining amount in the selected output destination printer and the amount of toner consumption required for performing printing job.

6. The print management system according to claim 1, wherein the management unit obtains printer schedules of the output candidate printers not predicted to stop in the middle of a print job, and selects the output destination printer to be assigned the printing job based on the printer schedules.

7. The print management system according to claim 1, wherein the print data comprises color-corrected pre-print data.

8. The print management system according to claim 1, wherein the management unit comprises a manual override through which a user selects the output destination printer and the print data and the management unit invalidates the previously selected output destination printer and the previously selected print data.

9. The print management system according to claim 8, wherein the management unit outputs multiple levels of failure prediction of printer engines of the output enabled printers comprising "failure probable", "failure possible", and "failure unlikely",
wherein, with "failure possible", the user selects the output destination printer and the print data using the manual override of the management unit.

10. A distributed printing system comprising:
a manuscript processor to receive print manuscript data from an internet-connectable terminal;
output devices comprising multiple output enabled printers; and
a print management system, connected to the manuscript processor and the output devices via a network,
the print management system comprising:
a management unit to receive print manuscript data from the manuscript processors, and obtain status information, from the multiple output enabled printers, indicating states of the respective multiple output enabled printers;
a status identification unit to predict whether or not respective output enabled printers stop in the middle of a print job; and
a print data generator to generate multiple types of print data whose amount of toner consumption during printing differs based on the print manuscript data,
wherein the management unit classifies those printers predicted by the status identification unit to have a smaller possibility of stopping in the middle of a print job as output candidate printers,
the management unit selects an output destination printer from the output candidate printers,
the management unit selects one type of print data from the multiple types of print data generated by the print data generator depending on the output destination printer, and
the management unit outputs the selected print data to the output destination printer.

11. A method for managing a distributed printing system, comprising:
receiving print manuscript data from an internet-connectable terminal;
obtaining status information, from connected multiple output enabled printers, indicating states of the respective multiple output enabled printers;
predicting whether or not the respective output enabled printers stop in the middle of a print job;
classifying those printers predicted to have a smaller possibility of stopping in the middle of a print job as output candidate printers;
selecting an output destination printer from the output candidate printers;
generating multiple types of print data whose amount of toner consumption during printing differs depending on the print manuscript data;
selecting one type of print data from the multiple types of print data depending on the output destination printer; and
outputting the selected print data to the output destination printer.

12. The managing method according to claim 11, wherein whether the output enabled printers stop in the middle of a print job is predicted based on failure prediction data for print engines of the output enabled printers.

13. The managing method according to claim 11, wherein whether the output enabled printers stop in the middle of a print job is predicted based on lifetime prediction data for the output enabled printers.

14. The managing method according to claim 11, wherein whether the output enabled printers stop in the middle of a print job is predicted based on data of toner remaining amount in the output enabled printers.

15. The managing method according to claim 11, wherein the print data to be printed in the output destination printer is selected based on data of the toner remaining amount in the selected output destination printer and the amount of toner consumption required for performing printing job.

16. The managing method according to claim 11, further comprising:
obtaining printer schedules of the output candidate printers not predicted to stop in the middle of a print job; and
selecting the output destination printer to be assigned the printing job based on the printer schedules.

17. The managing method according to claim 11, further comprising:
selecting, by a user, the output destination printer and the print data; and
invalidating the previously selected output destination printer and the previously selected print data.

18. The print management system according to claim 17, further comprising:

outputting multiple levels of failure prediction of printer engines of the output enabled printers comprising "failure probable", "failure possible", and "failure unlikely", wherein, with "failure possible", the user selects the output destination printer and the print data.

* * * * *